Jan. 27, 1925.
L. D. KENSIG
1,524,257
AUTOMATIC WATER SOFTENING APPARATUS
Filed May 21, 1923   2 Sheets-Sheet 1
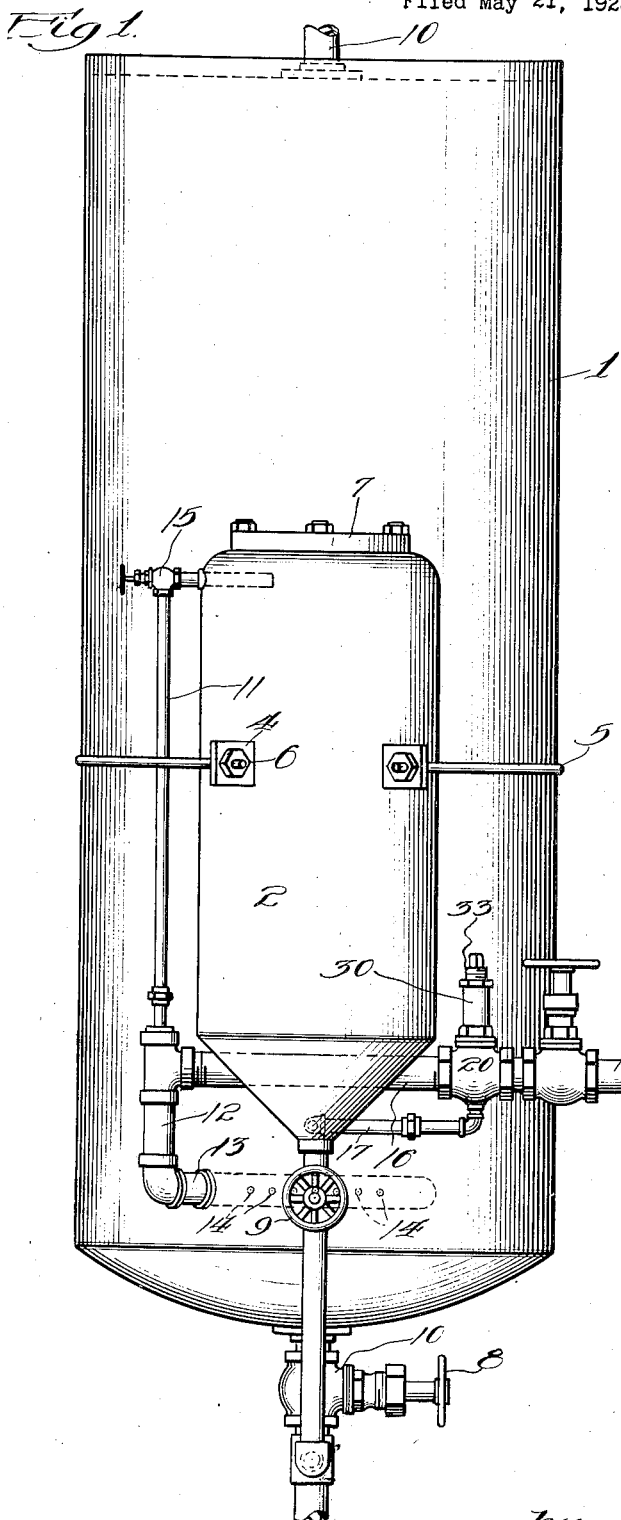
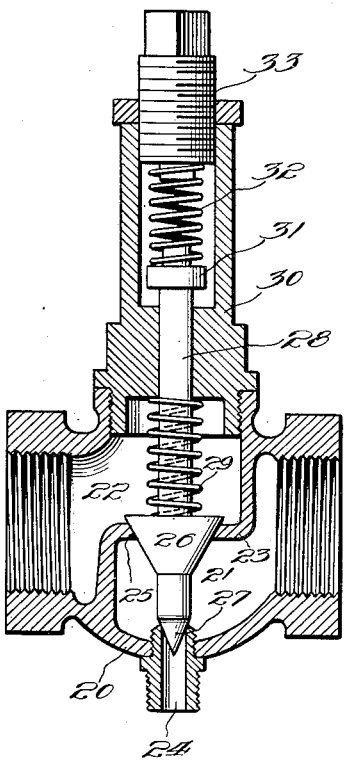

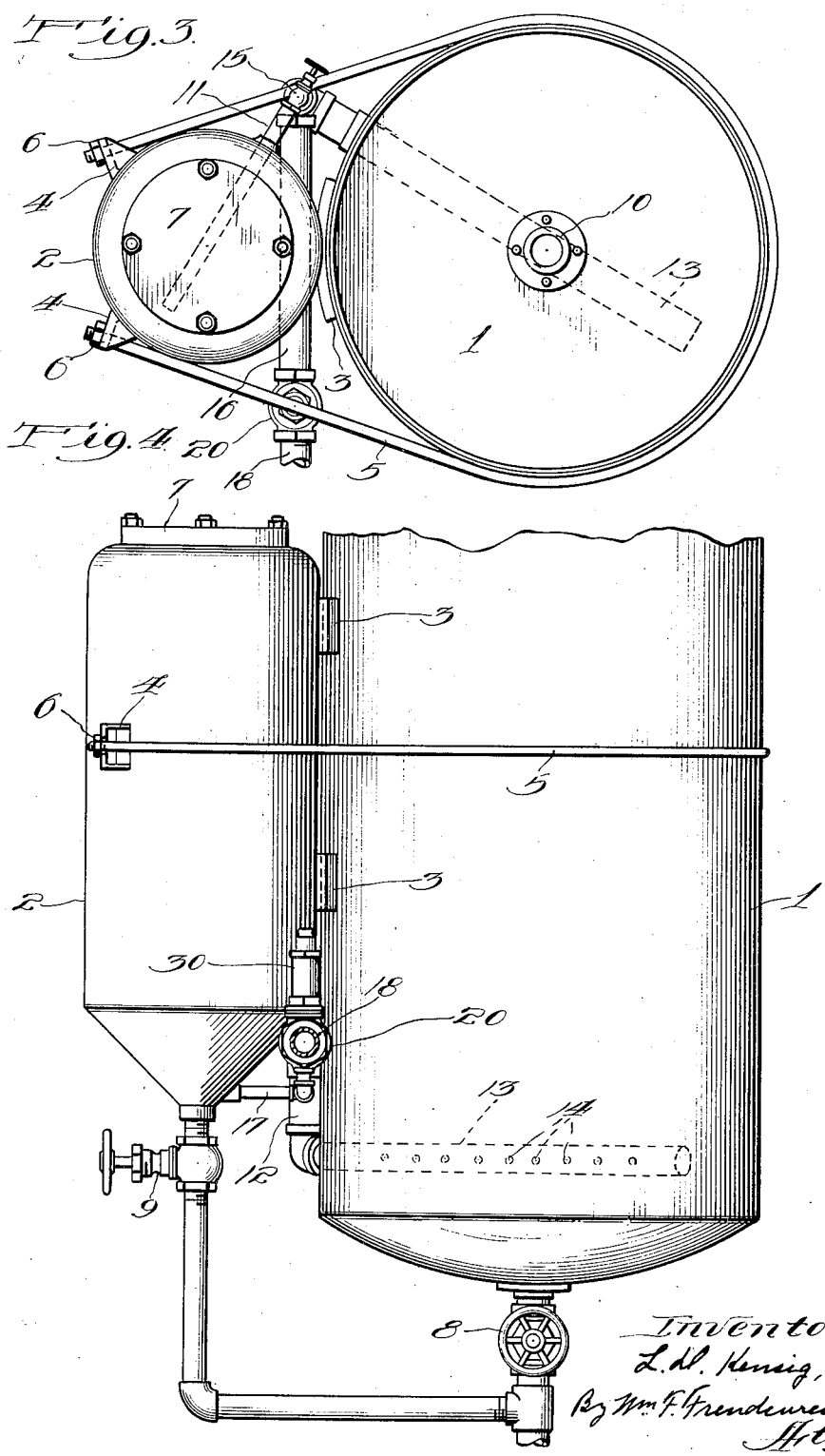

Patented Jan. 27, 1925.

1,524,257

UNITED STATES PATENT OFFICE.

LOUIS D. KENSIG, OF MADISON, WISCONSIN, ASSIGNOR TO JACKSON REUTER, OF MADISON, WISCONSIN.

AUTOMATIC WATER-SOFTENING APPARATUS.

Application filed May 21, 1923. Serial No. 640,318.

*To all whom it may concern:*

Be it known that I, LOUIS D. KENSIG, a citizen of the United States, residing at Madison, county of Dane, State of Wisconsin, have invented a certain new and useful Improvement in Automatic Water-Softening Apparatus, and declare the following to be a full, clear, and exact description of the same, such as will enable others skilled in the art to which it pertains to make and use the same, reference being had to the accompanying drawings, which form a part of this specification.

The present invention relates to that type of water softener in which the raw water is treated with lime or soda, or both, to soften it; and it has for its object to produce a simple and novel apparatus in which the chemical solution is prepared and automatically delivered to the settling or storage tank as treated water is withdrawn from the latter, without the use of any moving parts except a simple differential valve device.

In carrying out my invention I employ a tank for water, preferably a combined settling and storage tank, and another tank for the reception of the chemical in solid, comminuted form. The water tank is provided with a discharge outlet at the top; the top of the chemical tank is connected to the bottom of the water tank by a suitable conduit; and both tanks have inlets for raw water at the bottom. The raw water is supplied through a differential valve device which opens communication between the raw-water supply pipe and both of said inlets when the pressure in the water tank drops to a predetermined degree below that in the water pipe, no matter what the pressure in the raw water supply line may be, causing raw water to flow into both of said tanks. The valve device, furthermore, so divides the water flowing through the same that just enough raw water enters the bottom of the chemical tank, and flows up through the chemical therein, to force out of the top of the chemical tank and into the bottom of the water tank the quantity of chemical solution needed to soften the raw water entering the water tank. The differential valve has two fixed orifices to suit the particular water to be treated, insuring a fixed ratio at any rate of flow. The raw water preferably enters the water tank through the conduit between the two tanks so as to become mixed with the chemical solution passing through said conduit before either the raw water or the chemical solution enters the water tank.

Since the chemical solution is produced by passing raw water up through a body of chemical, there will be continual agitation of the chemical and therefore comparatively large charges of chemical may be placed in the chemical tank without danger that it will pack and interfere with the efficient operation of the softener. Ample space is provided above the chemicals in the chemical tank to permit settling, so that only a concentrated solution flows out of the top of the tank. Consequently the chemical supply need not be renewed as frequently as in other like systems, renewal of the chemicals in softeners used for domestic purposes being required only every twenty or thirty days; and, viewed in another of its aspects, my invention may be said to have for its object to produce a simple and novel water softener which will require only a minimum amount of attention on the part of the user, and no technical knowledge or skill on the part of the user in order to produce perfect results.

Viewed in another of its aspects, therefore, my invention may be regarded as having for its object to make it possible to change an existing water distributing system, containing a storage tank, without modification of such tank and with only slight modifications of the piping for the purpose of connecting in the chemical tank and the differential valve device.

Since the chemical tank will usually be much smaller than the water tank, it may conveniently be supported by the latter; and, viewed in another of its aspects, my invention may be said to have for its object a simple construction and arrangement which will permit a chemical tank to be mounted on a water tank without making any change or even boring a hole in the latter.

The various features of nevelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a front view of a water softener arranged in accordance with my invention; Fig. 2 is a central vertical section, on an enlarged scale, through the differential valve; Fig. 3 is a top plan view of the apparatus; and Fig. 4 is a side view of the apparatus, the upper portion of the water tank being broken away.

Referring to the drawings, 1 represents a water tank which, in the event that it is desired only to soften the hot water in a domestic water distribution system, may be the usual hot water tank. 2 is a small tank for containing a chemical in solid, comminuted form and supplying chemical to the water tank in the form of a concentrated solution. The chemical tank may be provided with one or more saddles 3 that will fit against the side of the water tank, where both are made cylindrical, as shown; and it may also be provided on the side opposite that on which the saddles are located, with two projecting lugs 4. In order to mount the chemical tank on the water tank, the saddles are placed against the latter and a tie rod or band 5 is then carried from one of the lugs around the water tank and back to the other lug; the ends of the tie rods passing through the two lugs and being provided with nuts 6 for drawing the rod tight. The chemical tank may conveniently be formed as a single casting having at the top a detachable cover 7 through which the chemical is introduced, or it may be made from steel plate. Each tank is provided at the bottom with a valve-controlled outlet, the valves being indicated at 8 and 9. The tanks may be emptied of sediment or slugs through these outlets, whenever desired. There is connected to the top of the water tank a pipe 10 through which the softened water to be consumed passes. The top of the chemical tank and the bottom of the water tank are connected by a conduit which preferably takes the form of an upper comparatively small pipe 11 connected at its lower end to a section of pipe 12 much larger in diameter than the pipe 11. In the arrangement shown, the pipe 12 is connected at its lower end to a horizontal pipe 13 which passes through the wall of the water tank and extends inwardly a considerable distance in the vicinity of the bottom of the tank. That portion of the horizontal pipe section within the tank is preferably provided with small perforations 14 distributed along the same so that fluid entering the water tank does so in the form of many small distributed streams preventing short circuiting. There may be a hand valve 15 in the pipe 11, to permit communication between the two tanks to be shut off if and when desired. The raw water should enter the bottom of the water tank so that the upper portion of the tank will always be filled with a body of water in condition for use. Since it is desirable not to delay the mixing of the chemical solution and the raw water, because the sooner this mixing takes place the more rapid will be the operation of the softener, the raw water may conveniently be admitted to the water tank through the conduit connecting the two tanks together, so that the raw water and the chemical solution are mixed before they enter the water tank, the mixture being delivered into the latter in the form of many small distributed streams. It is for this reason that the sections 12 and 13 of the conduit connecting the two tanks are made large in diameter, the raw-water delivery pipe 16 for the water tank being connected to said conduit at the juncture between the small section 11 and the large section 12. Raw water should enter the bottom of the chemical tank so that it will rise through the bed of chemical in the latter, and raw water is therefore supplied through a small delivery pipe 17 entering the extreme lower end of the chemical tank. The raw water is supplied from a raw-water pipe 18 to the delivery pipes 16 and 17 through an automatic differential valve device, shown in detail in Fig. 2.

The differential valve device consists of a hollow body member or casing 20 divided into two chambers 21 and 22 by a partition 23. The raw water pipe is attached to the casing so as to communicate directly with the chamber 21. The water delivery pipe 16 is connected to the casing so as to communicate directly with the chamber 22. The small water delivery pipe 17 is connected to the chamber 21 in the valve casing, conveniently through a nipple 24. The partition has therein an opening bounded by a valve seat 25, while the inner end of the nipple also has a valve seat bounding the opening therein. Co-operating with these two valve seats is a double valve comprising a conical member 26 fitting the valve seat 25 in the partition, and a smaller tapered member 27 entering the inner end of the nipple and adapted to co-operate with the surrounding valve seat at the inner end of the nipple. The hole or port controlled by the valve 26 is much larger in diameter than the internal diameter of the nipple, because only a small amount of water need be delivered to the chemical tank as compared to the amount of raw water that enters the water tank to be softened. It will be seen that because the two valves are conical or cone-like they may be so shaped to permit the streams of water flowing past the same to bear any desired relation to each other for a given lift of the valve. The double valve is carried on the lower end of a stem 28 surrounded by a spring 29 resting at the lower end on the valve 26 and at its upper end against the top of the casing. The spring tends constantly to hold the valves closed and will do so whenever the pressure in the chamber 22 (that is, the pressure in the water tank) plus the pressure of the spring is greater than the pressure in the raw-water pipe. Consequently, if the water tank is empty and there is pressure in the raw-water pipe, the resistance of the spring is overcome by such pressure and the valves will open, allowing water to flow into both tanks. As soon as the pressure in the water tank rises to a predetermined point the valves will close and will remain closed until water is withdrawn from the water tank and causes the pressure therein to fall slightly. The valves then automatically open, the pressure in the small water-delivery pipe rising above that in the large water-delivery pipe and forcing chemical solution out of the top of the chemical tank through the conduit between the tanks and mixing it with the water of lower pressure flowing through the large water-delivery pipe toward the water tank. The chemical solution flowing into the water tank while the valves are open is sufficient to soften the incoming raw water. When the pressure in the water tank again rises to a predetermined point the valves again close. This cycle is repeated whenever water is drawn from the water tank for consumption.

The pressure of the spring 29 is constant. In order to permit the spring pressure on the valves to be varied I provide an additional spring which may be adjusted accurately to calibrate the device. In the arrangement shown, the valve stem 28 extends upwardly through the bottom of a cup-shaped member 30 screwed into the top of the valve casing and is provided, adjacent to its upper end, with a collar 31 on which rests a spring 32. The upper end of the spring 32 is engaged by a plug 33 screwed into the open end of the chamber in the member 30. By screwing the plug up or down, the pressure of the spring 32 is varied, thus varying the total spring pressure on the valves.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, a closed water tank having a discharge outlet, a closed chemical tank, a connection between the top of the chemical tank and the bottom of the water tank, a raw-water pipe, and means controlled by a difference in pressure between water in the said pipe and the water in the water tank, for causing water to flow from said pipe into the bottoms of said tanks to replace water withdrawn through said outlet and in the same proportions as those existing between the raw water entering the water tank and the chemical solution necessary to soften such raw water.

2. In combination, a closed water tank having a discharge outlet, a chemical tank, a conduit connecting the top of the chemical tank with the bottom of the water tank, a raw-water pipe; and connections between said raw-water pipe and said tanks including differential valve mechanism constructed and arranged to cause raw water to flow directly from said raw-water pipe into the chemical tank and also to flow from the raw-water pipe into the water tank whenever the pressure in the water tank drops to a predetermined point below that in the raw-water pipe.

3. In combination, a closed water tank having an outlet at the top, a chemical tank, a conduit connecting the top of the chemical tank to the bottom of the water tank, a raw-water pipe, a connection between said pipe and the water tank including a valve constructed and arranged to open when the pressure in the water tank drops to a predetermined degree below that in said pipe, and a connection between the said chemical tank and said pipe including a valve operatively related to the other valve so as to open and close therewith.

4. In combination, a closed water tank having an outlet at the top, a chemical tank, a conduit connecting the top of the chemical tank to the bottom of the water tank, a raw-water pipe, a connection between said pipe and said conduit including a valve constructed and arranged to open when the pressure in the water tank drops to a predetermined degree below that in said pipe, and a connection between the bottom of said chemical tank and said pipe including a valve operatively related to the other valve so as to open and close therewith.

5. In combination, a closed water tank having an outlet at the top, a chemical tank, a conduit connecting the top of the chemical tank to the bottom of the water tank, a raw-water pipe, a connection between said pipe and the water tank including a valve constructed and arranged to open when the pressure in the water tank drops to a predetermined degree below that in said pipe, and a connection between the said chemical tank and said pipe including a valve operatively related to the other valve so as to open and close therewith, said valves being so proportioned relatively to each other that the raw water that flows into the chemical tank equals the amount of chemical solution that must flow from the chemical tank into the water tank to soften the raw water flowing into the water tank.

6. In combination, a closed water tank having an outlet at the top, a closed chemical tank, a conduit connecting the upper end of the chemical tank with the bottom of the water tank, a raw-water pipe, a water-delivery pipe between the said raw water pipe and the bottom of the chemical tank, a valve between the aforesaid pipes, a pipe connecting the raw-water pipe to the water tank, a valve between the two last-mentioned pipes constructed and arranged to open when the pressure in the water tank drops to a predetermined degree below the pressure in the raw-water pipe, and a connection between said valves causing them to open and close in unison with each other.

7. In combination, a closed water tank having an outlet at the top, a closed chemical tank, a conduit connecting the upper end of the chemical tank with the bottom of the water tank, a raw-water pipe, a water-delivery pipe between the said raw-water pipe and the bottom of the chemical tank, a valve between the aforesaid pipes, a pipe connecting the raw-water pipe to the water tank, a valve between the two last-mentioned pipes constructed and arranged to open when the pressure in the water tank drops to a predetermined degree below the pressure in the raw-water pipe, and a connection between said valves causing them to open and close in unison with each other, said valves being so proportioned relatively to each other that the raw water that flows into the chemical tank equals the amount of chemical solution that must flow from the chemical tank into the water tank to soften the raw water flowing into the water tank.

8. In combination, a closed water tank having a discharge outlet, a closed chemical tank, a pipe connecting the top of the chemical tank to the bottom of the water tank, a water-delivery pipe connected to the bottom of the chemical tank, a water-delivery pipe connected to the first-mentioned pipe, a raw-water pipe, and differential valve mechanism between said raw-water pipe and said water-delivery pipes constructed and arranged to open communication between the raw-water pipe and the other two when the pressure in said water tank drops to a predetermined degree below the pressure in the raw-water pipe and to close such communication at other times.

9. In combination, a closed water tank having a discharge outlet, a closed tank for containing a softening agent, a raw-water pipe, a pipe connecting the top of the chemical tank and the bottom of the water tank, a valve casing connected to the raw-water pipe, a water-delivery pipe leading from said casing into the bottom of the chemical tank, a water-delivery pipe between said casing and the pipe extending between the top of the chemical tank and the bottom of the water tank, and valve mechanism in said casing operating to open communication between the raw-water pipe and both of said delivery pipes when the pressure in the raw-water pipe becomes a predetermined degree greater than that in the said pipe between said tanks and to close such communication when there is a lesser difference in pressure between such pipes.

In testimony whereof, I sign this specification.

LOUIS D. KENSIG.